United States Patent [19]

Yeh et al.

[11] Patent Number: 4,971,409
[45] Date of Patent: Nov. 20, 1990

[54] REAL-TIME OPTICAL IMAGE SUBTRACTION

[75] Inventors: Pochi A. Yeh, Thousand Oaks; Ian C. McMichael, Port Hueneme, both of Calif.

[73] Assignee: Rockwell International Corporation, El Segundo, Calif.

[21] Appl. No.: 342,412

[22] Filed: Apr. 24, 1989

[51] Int. Cl.$^5$ .......................... G02F 3/00; G03H 1/16

[52] U.S. Cl. ............................... 350/3.64; 350/162.13; 350/162.19; 364/822

[58] Field of Search .................... 350/3.64, 3.61, 3.62, 350/162.19, 3.67, 162.12, 162.13, 162.14; 364/713, 728.03, 822

[56] References Cited

U.S. PATENT DOCUMENTS

| | | | |
|---|---|---|---|
| 4,025,195 | 5/1977 | Ebersole et al. | |
| 4,124,278 | 11/1978 | Grinberg et al. | |
| 4,212,536 | 7/1980 | Bencze et al. | |
| 4,277,137 | 7/1981 | Upatnieks et al. | |
| 4,703,992 | 11/1987 | Yeh | 350/3.64 |
| 4,718,749 | 1/1988 | Chiou et al. | |
| 4,761,059 | 8/1988 | Yeh et al. | 350/3.64 |
| 4,768,846 | 9/1988 | Connors et al. | 350/3.64 |
| 4,773,719 | 9/1988 | Anderson et al. | 350/3.64 |
| 4,877,297 | 10/1989 | Yeh | 350/3.64 |

OTHER PUBLICATIONS

Ocha, Real-Time Intensity Inversion Using Two-Wave and Four-Wave Mixing in Photorefractive Bi$_{12}$GeO$_{20}$, Applied Optics, vol. 24, p. 1826.
Patorski, Subtraction & Addition of Optical Signals Using a Double-Grating Shearing Interferometer, Optics Communications, vol. 29, p. 13 (1979).
Yu, et al., Incoherent Image Addition and Subtraction: A Technique, Applied Optics, vol. 18, p. 2705 (1979).
Indebetouw, Real-Time Incoherent Subtraction of Irradiance, Applied Optics, vol. 19, p. 1218 (1980).
Ja, Real-Time Image Subtraction in Four-Wave Mixing with Photorefractive Bi$_{120}$BeO$_{20}$ Crystals, Optics Communications, vol. 42, p. 377 (1982).
Kwong, et al., Real Time Image Subtraction and "Exclusive OR" Operation Using a Self-Pumped Phase Conjugate Mirror, Applied Phys. Ltrs., vol. 48, p. 201 (1986).
Anderson, et al., Optical Tracking Novelty Filter, Optics Letters, vol. 12, pp. 12, 123 (1987).
Chiou, et al., Parallel Image Subtraction Using a Phase-Conjugate Michelson Interferometer, Optics Letters, vol. 11, p. 306 (1986).
Fainman, Optical Digital Logic Operations by Two-Beam Coupling in Photo-Refractive Material, Applied Optics, vol. 25, p. 1598 (1986).
Yeh, et al., "Real-Time Optical Image Subtraction Using Dynamic Holographic Interference in Photorefractive Media," Optics Letters, vol. 13, No. 7, Jul. 1988, pp. 586 to 588.
Feinberg, "Self-Pumped, Continuous-Wave Phase Conjugator Using Internal Reflection," Optics Letters, vol. 7, No. 10, pp. 486–488, Oct. 1982.
Gabor et al, "Optical Image Synthesis (Complex Amplitude Addition and Subtraction) by Holographic Fourier Transformation," Physics Letters, vol. 18, No. 2, Aug. 15, 1965, pp. 116–118.

Primary Examiner—Bruce Y. Arnold
Assistant Examiner—Martin Lerner
Attorney, Agent, or Firm—John J. Deinken

[57] ABSTRACT

An apparatus for subtracting the amplitude of a first optical image on a first beam from the amplitude of a second optical image on a second beam includes a first beam splitter to divide the first beam into a first transmitted beam and a first reflected beam and to divide the second beam into a second transmitted beam and a second reflected beam. The first transmitted beam and the second reflected beam combine as a first mixed beam, while the first reflected beam and the second transmitted beam combine as a second mixed beam. A pinhole removes spatial information from the second mixed beam. The first and second mixed beams interfere within a nonlinear medium to create a composite hologram. A coherent reference beam directed at the nonlinear medium reads the interference pattern, so that the difference between the first and second images is superimposed on the reference beam emerging from the nonlinear medium. A second nonlinear medium may be used to retroreflect one of the mixed beams toward the nonlinear medium as the reference beam, in which case the pinhole is not required.

16 Claims, 2 Drawing Sheets

REAL-TIME OPTICAL IMAGE SUBTRACTION

BACKGROUND OF THE INVENTION

This invention is concerned with techniques for determining the difference between two optical images.

The inherent parallelism of optics (a beam of light can carry different information on various portions of the light beam without interference) and the wide bandwidth which an optical system offers for communication make these systems ideal for applications such as real-time image processing, optical interconnection schemes, and associative processing. As a result, optics is emerging as an area of increasing importance in high-speed information processing. Real-time image processing is of particular interest in fields, such as robotics, which require the recognition and tracking of objects. A clear advantage to the optical approach for these applications is the capability of parallel processing, with its concomitant increase in processing speed over digital computing techniques. Additional applications for optical image processing include industrial quality assurance, optical logic gates, and the detection of motion in a scene.

The subtraction of two images was first proposed by Gabor, et al. (Physics Letters, Volume 18, Page 116 (1965)) by using a successive recording of the two images on a holographic plate with a 180 degree phase shift between the two and a subsequent readout of the composite hologram. This method requires the addition of a 180 degree phase shift, which must remain uniform throughout the two dimensional region within which the images overlap during the second recording. Image subtraction can also be achieved by other techniques, most of which require that a phase shift of 180 degrees be introduced between the two images. Recently, time reversal in phase conjugation was used to provide such a phase shift and the subtraction of two intensity patterns using a phase-conjugate Michelson interferometer was demonstrated (Chiou and Yeh, Phase-Conjugate Interferometric Coherent Image Subtraction, U.S. Pat. No. 4,718,749). These methods in the prior art, however, are limited in their applicability to cascaded operations and reflective objects because of their requirement for round-trip propagation.

SUMMARY OF THE INVENTION

This invention provides an apparatus for subtracting the amplitude of a first optical image, superimposed on a first beam of coherent light, from the amplitude of a second optical image, superimposed on a second beam of coherent light which is incoherent with respect to the first beam. A first beam splitter divides the first beam into a first transmitted beam and a first reflected beam and divides the second beam into a second transmitted beam and a second reflected beam. The first transmitted beam and the second reflected beam combine as a first mixed beam and the first reflected beam and the second transmitted beam combine as a second mixed beam. A pinhole disposed in the path of the second mixed beam removes spatial information from the second mixed beam. The first and second mixed beams interfere within a nonlinear medium to create a composite hologram. A coherent reference beam directed at the nonlinear medium reads the interference pattern, so that the difference between the first and second images is superimposed on the reference beam emerging from the nonlinear medium.

In a more particular embodiment, first and second reflectors constrain the first and second mixed beams to propagate in an optical path including the first beam splitter and the nonlinear medium. The second mirror may be a second beam splitter for extracting the emerging reference beam. The apparatus may also include a reflector for retroreflecting the second mixed beam toward the nonlinear medium such that the retroreflected beam comprises the reference beam. In a further refinement, the nonlinear medium is a photorefractive crystal.

Another version of the invention includes the first beam splitter and the nonlinear medium within which the first and second mixed beams interfere. A second nonlinear medium retroreflects one of the mixed beams toward the nonlinear medium as the reference beam to read the interference pattern. In this embodiment, the pinhole may be replaced by a mode scrambler.

DESCRIPTION OF THE INVENTION

It is an outstanding feature of this invention to provide a new optical subtraction technique which utilizes the simultaneous recording and readout of two images in a nonlinear medium with a double Mach-Zehnder interferometer. The 180 degree phase shift which is required between the two images is automatically present, by virtue of the Stokes principle, between the two sets of image-bearing holograms. When such a composite hologram is read out by a reference beam, parallel subtraction of the two images is obtained.

Figure 1:
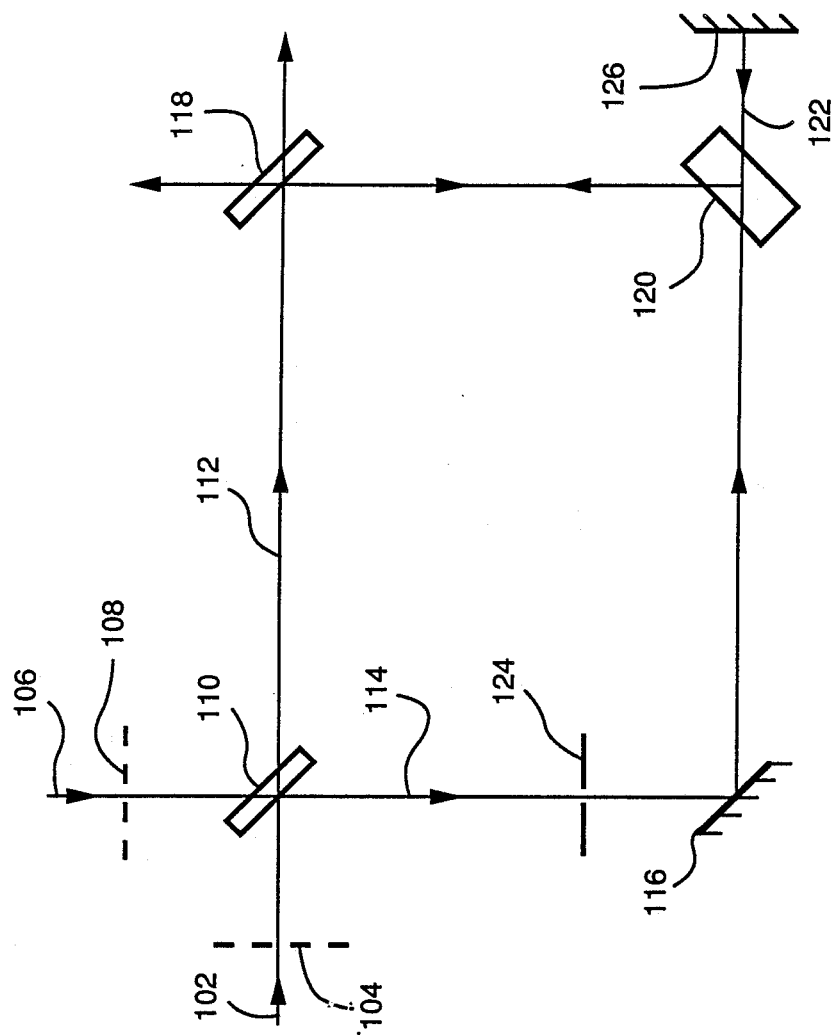
FIG. 1 is a schematic diagram depicting one embodiment of the invention.

FIG. 1 is a schematic diagram depicting one embodiment of the invention and illustrating the manner in which the invention operates. A first beam of coherent light 102 passes through a first transparency 104, so that the image on the transparency is superimposed onto the beam 102. Similarly, a second beam of coherent light 106, which is incoherent with respect to the first beam, passes through a second transparency 108, thereby superimposing the image from the second transparency onto the second beam 106. As those skilled in the art will appreciate, although the illustrated embodiment involves images on transparencies, the invention can also be used with reflected images from opaque objects.

A first beam splitter 110 divides the first beam 102 into a first transmitted beam and a first reflected beam. The first beam splitter also divides the second beam 106 into a second transmitted beam and a second reflected beam, such that the first transmitted beam and the second reflected beam combine as a first mixed beam 112 and such that the first reflected beam and the second transmitted beam combine as a second mixed beam 114. A pinhole 124 is placed in one arm of the interferometer to act as a spatial filter and eliminate spatial information about the images on one arm of the interferometer (see Yeh, et al., Real-Time Optical Image Subtraction using Dynamic Holographic Interference in Photorefractive Media, Optics Letters, Volume 13, Page 586 (1988)).

A mirror 116 and a second beam splitter 118 direct the first and second mixed beams into a nonlinear medium 120, where the first and second mixed beams interfere and create a composite hologram. Because of the Stokes principle, the holograms of the mixed beams will be shifted relative to each other by exactly 180°. A coherent reference beam 122 is directed at the nonlinear medium to read out the interference pattern, such that the difference between the first and second images is superimposed on the reference beam emerging from the nonlinear medium. The second beam splitter 118 is used to sample the emerging reference beam so that the difference between the first and second images can be obtained from the reference beam. The intensity pattern on the reference beam will correspond to the square magnitude of the algebraic subtraction of the two complex image amplitudes. To obtain a high-contrast image subtraction, it is desirable that the magnitude of the first image be as close as possible to the magnitude of the second image.

The holograms will contain the complex field amplitudes of the images instead of the intensities of the images. When such a superposition of holograms (which, because of the Stokes principle, are shifted relative to one another by 180°) is read out by the reference beam, the diffracted beam will consist of the algebraic difference of the two complex fields. Strictly speaking, the amplitude of the diffracted beam when observed at the difference plane is proportional to the complex conjugate of the difference between the first and second images. The reference beam 122 must be counter-propagating with respect to the second mixed beam in order to read out the hologram efficiently (i.e., to select only the fundamental component of the intensity pattern). The reference beam 122 can be either coherent or incoherent with respect to the two illumination beams 102 and 106, as it simply reads the gratings written in the nonlinear medium 120.

One way in which a reference beam can be obtained is by positioning a mirror 126 to retroreflect the second mixed beam toward the nonlinear medium, such that the retroreflected beam operates as the reference beam to read out the holograms in the medium 120.

This new technique can also be used for the subtraction of two three-dimensional objects. When used for this purpose, the difference must be observed in a volume instead of a plane. In practice, this could be achieved by examining the beam in a scattering medium. Since the invention does not require that there be a round-trip propagation through the transparencies, it can be used for multiple operations, cascaded operations, or even do-loop type operations.

Real-time optical image subtraction according to this invention was demonstrated using dynamic holographic interference in a photorefractive BaTiO$_3$ crystal. The light source was an argon-ion laser operating in a multilongitudinal mode at 515 nm with an output power of a few hundred milliwatts. A Faraday rotator and polarizers were used to isolate the laser from retroreflections. An optical wedge element picked off a small fraction (approximately 4%) of the laser output for the reference beam. A telescope arrangement of lenses expanded and collimated the beam to a 1.5 cm diameter. The beam was then split into two equal components by a beam splitter and directed through first and second transparencies. A multiple mirror arrangement lengthened the path of one of the beams to ensure that the two beams were mutually incoherent.

After the image-bearing beams were mixed by a 50% beam splitter, they were tightly focused and directed into a photorefractive BaTiO$_3$ crystal, where they interfered with a crossing angle of approximately 45°. Spatial information was removed from one of the beams by a lens and pinhole arrangement. The reference beam read the holograms written in the crystal and was sampled at the output of another beam splitter and imaged onto a screen.

The phase-conjugate reflectivity in this embodiment was approximately 30% for both beams. Typical power levels incident on the crystal were on the order of tens of milliwatts for the two writing beams and a few milliwatts for the reference beam. All beams incident on the crystal had an extraordinary polarization.

Figure 2:
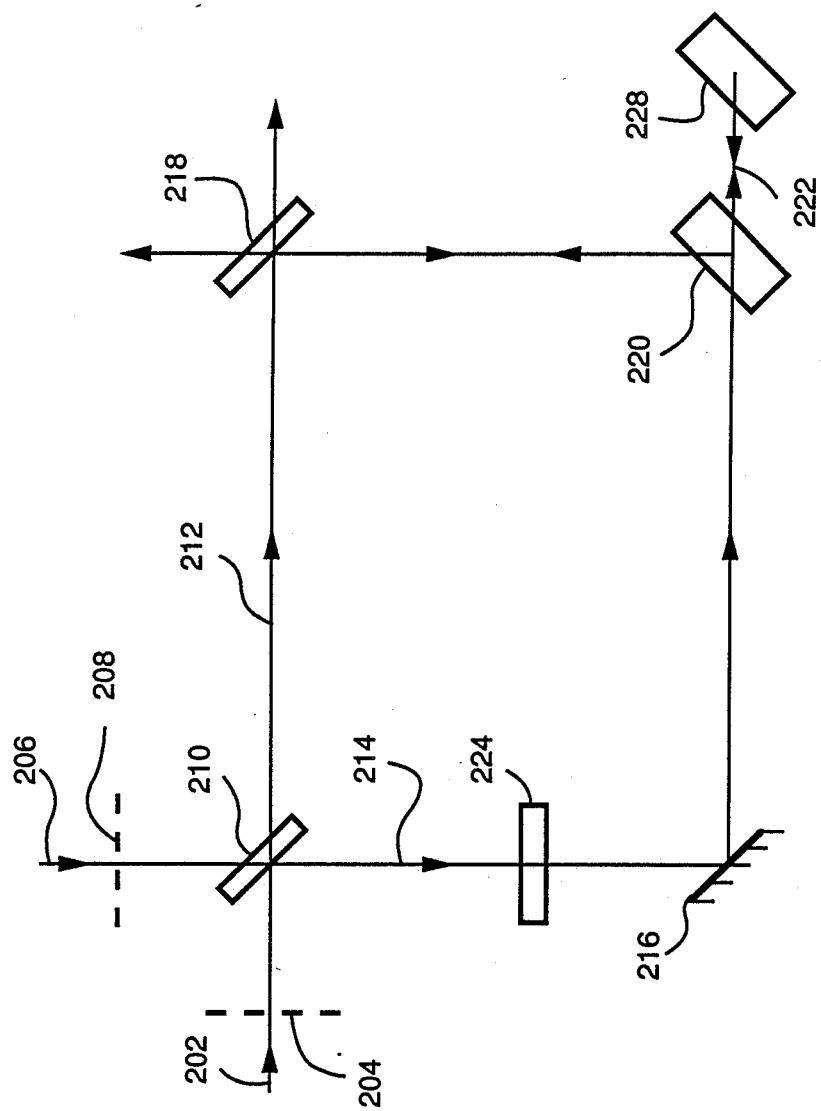
FIG. 2 is a schematic diagram illustrating another embodiment of the invention.

Another embodiment of the invention is illustrated in schematic form in FIG. 2. This embodiment is similar to that of FIG. 1, with the first beam 202, first transparency 204, second beam 206, second transparency 208, first beam splitter 210, first mixed beam 212, second mixed beam 214, mirror 216, second beam splitter 218, nonlinear medium 220, and coherent reference beam 222 all similar or identical to the analogous elements in FIG. 1. The embodiment illustrated in FIG. 1, however, can be difficult to align, especially for the case of images, as opposed to Gaussian beams. The embodiment of FIG. 2, provides an alternative approach using self-pumping of the input beams (see, e.g., Feinberg, Optics Letters, Volume 7, Page 486 (1982)). In this case, the pinhole may be replaced with a mode scrambler 224 (such as, for example, a multimode optical fiber) to remove spatial information from one of the arms. A phase conjugate mirror 228 is used to retroreflect the second mixed beam as the reference beam for reading out the holograms in the nonlinear element 220. The phase conjugate mirror can be, for example, a self-pumped phase conjugator, a phase conjugate mirror using four-wave mixing, a phase conjugate mirror using stimulated Brillouin scattering, or a mutually pumped phase conjugator. With this arrangement, the counter-propagating requirement for the reference beam will be automatically satisfied.

In conclusion, this new technique for optical image subtraction provides parallel and real-time amplitude subtraction of two complex images by using holographic interference in a photorefractive medium. The invention provides an automatic phase shift of 180° between the complex images and may be viewed as a real-time implementation of Gabor's image-subtraction technique. The major advantages of this technique over image subtraction techniques in the prior art are the amplitude subtraction capability (instead of intensity subtraction) and the ability to process three-dimensional images and perform multiple operations, since there is only a single pass through the transparencies. In addition, the phase information contained in the transparencies can be determined by the inventive technique, since the output from the interferometer is proportional to the difference in the field amplitudes.

The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference: Feinberg, Optics Letters, Volume 7, Page 486 (1982); Gabor, et al., Physics Letters, Volume 18, Page 116 (1965); Yeh, et al., Real-Time Optical Image Subtraction using Dynamic Holographic Interference in Photorefractive Media, Optics Letters, Volume 13, Page 586 (1988).

We claim:

1. An apparatus for subtracting the amplitude of a first optical image, superimposed on a first beam of coherent light, from the amplitude of a second optical image, superimposed on a second beam of coherent light which is incoherent with respect to the first beam, comprising:
    a first beam splitter for dividing the first beam into a first transmitted beam and a first reflected beam and for dividing the second beam into a second transmitted beam and a second reflected beam, such that the first transmitted beam and the second reflected beam combine as a first mixed beam and such that the first reflected beam and the second transmitted beam combine as a second mixed beam;
    a pinhole disposed in the path of the second mixed beam for removing spatial information from the second mixed beam;
    a nonlinear medium within which the first and second mixed beams interfere to create a composite hologram; and
    a coherent reference beam directed at the nonlinear medium to read the interference pattern, such that the difference between the first and second images is superimposed on the reference beam emerging from the nonlinear medium.

2. The apparatus of claim 1, further comprising:
    first and second reflectors for constraining the first and second mixed beams to propagate in an optical path including the first beam splitter and the nonlinear medium.

3. The apparatus of claim 2, wherein the second mirror further comprises a second beam splitter for extracting the emerging reference beam.

4. The apparatus of claim 1, further comprising a reflector for retroreflecting the second mixed beam toward the nonlinear medium such that the retroreflected beam comprises the reference beam.

5. The apparatus of claim 1, wherein the nonlinear medium further comprises a photorefractive crystal.

6. An apparatus for subtracting the amplitude of a first optical image, superimposed on a first beam of coherent light, from the amplitude of a second optical image, superimposed on a second beam of coherent light which is incoherent with respect to the first beam, comprising:
    a first beam splitter for dividing the first beam into a first transmitted beam and a first reflected beam and for dividing the second beam into a second transmitted beam and a second reflected beam, such that the first transmitted beam and the second reflected beam combine as a first mixed beam and such that the first reflected beam and the second transmitted beam combine as a second mixed beam;
    a mode scrambler disposed in the path of the second mixed beam for removing spatial information from the second mixed beam;
    a first nonlinear medium within which the first and second mixed beams interfere to create a composite hologram; and
    a second nonlinear medium for retroreflecting one of the mixed beams toward the nonlinear medium as a reference beam to read the interference pattern, such that the difference between the first and second images is superimposed on the reference beam emerging from the nonlinear medium.

7. The apparatus of claim 6, further comprising:
    first and second reflectors for constraining the first and second mixed beams to propagate in an optical path including the first beam splitter and the first nonlinear medium.

8. The apparatus of claim 7, wherein the second mirror further comprises a second beam splitter for extracting the emerging reference beam.

9. The apparatus of claim 6, wherein the first nonlinear medium further comprises a photorefractive crystal.

10. The apparatus of claim 6, wherein the second nonlinear medium further comprises a photorefractive crystal.

11. A method for subtracting the amplitude of a first optical image, superimposed on a first beam of coherent light, from the amplitude of a second optical image, superimposed on a second beam of coherent light which is incoherent with respect to the first beam, comprising the steps of:
    dividing the first beam into a first transmitted beam and a first reflected beam;
    dividing the second beam into a second transmitted beam and a second reflected beam,
    such that the first transmitted beam and the second reflected beam combine as a first mixed beam and such that the first reflected beam and the second transmitted beam combine as a second mixed beam;
    directing the second mixed beam through a pinhole to remove spatial information from the second mixed beam;
    directing the first and second mixed beams into a nonlinear medium such that the first and second mixed beams interfere within the medium to create a composite hologram; and
    directing a coherent reference beam at the nonlinear medium to read the interference pattern, such that the difference between the first and second images is superimposed on the reference beam emerging from the nonlinear medium.

12. The method of claim 11, wherein the step of directing a coherent reference beam further comprises the step of positioning a reflector to retroreflect the second mixed beam toward the nonlinear medium to read the interference pattern, such that the difference between the first and second images is superimposed on the reference beam emerging from the nonlinear medium.

13. The method of claim 11, wherein the step of directing the first and second mixed beams into a nonlinear medium further comprises the step of directing the first and second mixed beams into a photorefractive crystal such that the first and second mixed beams interfere within the crystal to create a composite hologram.

14. A method for subtracting the amplitude of a first optical image, superimposed on a first beam of coherent light, from the amplitude of a second optical image, superimposed on a second beam of coherent light which is incoherent with respect to the first beam, comprising the steps of:
    dividing the first beam into a first transmitted beam and a first reflected beam;
    dividing the second beam into a second transmitted beam and a second reflected beam, such that the first transmitted beam and the second reflected beam combine as a first mixed beam and such that the first reflected beam and the second transmitted beam combine as a second mixed beam;

directing the second mixed beam through a mode scrambler to remove spatial information from the second mixed beam;

directing the first and second mixed beams into a first nonlinear medium such that the first and second mixed beams interfere within the medium to create a composite hologram; and positioning a second nonlinear medium to retroreflect the second mixed beam toward the first nonlinear medium and read the interference pattern as a reference beam, such that the difference between the first and second images is superimposed on the reference beam emerging from the nonlinear medium.

15. The method of claim 14, wherein the step of directing the first and second mixed beams into a first nonlinear medium further comprises the step of directing the first and second mixed beams into a first photorefractive crystal such that the first and second mixed beams interfere within the crystal to create a composite hologram.

16. The method of claim 15, wherein the step of positioning a second nonlinear medium further comprises the step of positioning a second photorefractive crystal to retroreflect the second mixed beam toward the first photorefractive crystal and read the interference pattern as a reference beam, such that the difference between the first and second images is superimposed on the reference beam emerging from the first photorefractive crystal.

* * * * *